United States Patent
Chi et al.

(10) Patent No.: US 8,908,638 B2
(45) Date of Patent: Dec. 9, 2014

(54) METHOD FOR HANDOVER OF TERMINAL, NETWORK ELEMENT, BASE STATION, AND COMMUNICATION SYSTEM

(75) Inventors: Caixia Chi, Shanghai (CN); Christine Liu, Shanghai (CN); Ruibing Hao, Shanghai (CN); Xuejun Cai, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 634 days.

(21) Appl. No.: 12/863,295

(22) PCT Filed: Jan. 17, 2008

(86) PCT No.: PCT/CN2008/000128
§ 371 (c)(1),
(2), (4) Date: Jul. 16, 2010

(87) PCT Pub. No.: WO2009/089658
PCT Pub. Date: Jul. 23, 2009

(65) Prior Publication Data
US 2011/0013590 A1      Jan. 20, 2011

(51) Int. Cl.
*H04W 4/00* (2009.01)
*H04W 36/00* (2009.01)
*H04W 36/14* (2009.01)
*H04W 36/30* (2009.01)

(52) U.S. Cl.
CPC .............. *H04W 36/14* (2013.01); *H04W 36/30* (2013.01)
USPC .......................................... 370/331; 455/439

(58) Field of Classification Search
USPC ............... 370/331–334; 455/436–444
See application file for complete search history.

(56) References Cited

U.S. PATENT DOCUMENTS

| 2002/0068571 A1 | 6/2002 | Ohlsson et al. |
| 2002/0196755 A1 | 12/2002 | Hidaka et al. |
| 2006/0094432 A1* | 5/2006 | Chang et al. .................. 455/439 |

FOREIGN PATENT DOCUMENTS

| CN | 1396734 A | 2/2003 |
| CN | 1794681 A | 6/2006 |

(Continued)

OTHER PUBLICATIONS ("A Seamless and Proactive End-to-End Mobility Solution for Roaming Across Heterogeneous Wireless Networks"; Chuanxiong Guo, Zihua Guo, Qian Zhang, Wenwu Zhu; IEEE Journal on Selected Areas in Communicaitons vol. 22 No. 5 Jun. 2004).*

(Continued)

*Primary Examiner* — Afshawn Towfighi
(74) *Attorney, Agent, or Firm* — Fay Sharpe LLP (57) ABSTRACT

The present invention relates to a method for handover of a mobile terminal from a first network to a second network, a network element, a mobile terminal, a base station and a communications system as well as a computer program product and a storage medium. The method comprises the steps of: determining a WDP including an unnecessary handover probability and a missing handover probability according to conditions of the first network and the second network; detecting at least of the following: whether the unnecessary handover probability is greater than the missing handover probability, whether the unnecessary handover probability is greater than a specific threshold and whether the missing handover probability is smaller than a specific threshold; and making a handover decision based on the detection result. The present invention can select a more suitable target network for handover at a more suitable time, thus ensuring the continuity of a mobile user's call.

18 Claims, 4 Drawing Sheets

(56) References Cited

FOREIGN PATENT DOCUMENTS

| JP | 2002 345019 | 11/2002 |
|----|----|----|
| JP | 2010 5080709 | 3/2010 |
| WO | WO 2008/054800 | 5/2008 |

OTHER PUBLICATIONS

International Search Report for PCT/CN2008/000128.
Chi, C., et al., "Modeling and Analysis of Handover Algorithms", Global Telecommunications Conference 2007, IEEE Nov. 1, 2007, pp. 4473-4477.

* cited by examiner

METHOD FOR HANDOVER OF TERMINAL, NETWORK ELEMENT, BASE STATION, AND COMMUNICATION SYSTEM

TECHNICAL FIELD OF THE INVENTION

The present invention relates to radio communication, in particular, to the technology of handover of a mobile terminal between networks.

BACKGROUND OF THE INVENTION

Technology advancement in wireless and mobile communications in recent years has resulted in a wide spread deployment of various mobile and wireless networks, including GSM, CDMA, satellite, WLAN, WiMAX and Bluetooth, etc. Each network is tailored to suit particular market trends, or particular types of users with special service needs. Such a network diversity offers different choices in terms of bandwidth, security, and coverage areas for mobile users. For example, WLANs offer high bandwidth with limited mobility scope, whereas cellular networks offer universal network access with lower bandwidth and higher costs. Even within the same type of networks, conditions of different cells or subnets change dynamically. Considering all these differences, mobile terminals or networks have to face problems such as how to select the best network, when to initiate a handover, how to achieve seamless handovers between networks. Moreover, with the development of the multimedia communication, many new types of network applications come up with different requirements on network services. Hence it is important to apply an appropriate handover decision algorithm to satisfy different application's requirements under different network conditions/configurations.

Various handover decision algorithms have been proposed in past few years, and all the work concentrates on the algorithms with RSS as the main criterion. Traditional handover decision algorithms rely on Received Signal Strength (RSS) and a handover is initiated when the RSS is below a specific threshold. But RSS only indicates the usability of a network, and cannot give more details on a network such as the available bandwidth which is more meaningful for upper-layer applications. For a terminal handover between heterogeneous networks, RSS is also not suitable for being a criterion due to the different physical technologies adopted by different networks. In addition, for traditional RSS-based handover decision algorithms, a channel model is adopted to evaluate an RSS-criterion-based handover algorithm, in which such three performance parameters as a lost call probability, an unnecessary handover probability and a handover probability are defined.

To better meet the requirements of upper-layer applications, link-layer parameters (such as bandwidth, delay) are also considered, especially for terminal handover across heterogeneous networks (so-called vertical handover). Along with the proposal of such a lot of algorithms, it needs to discuss how to evaluate these handover algorithms. All these algorithms are proposed in an intuitive way without any guarantee of the wrong decision probability (WDP).

SUMMARY OF THE INVENTION

To solve the above problem in the prior art, the invention provides a method for handover of a terminal from a first base station to a second base station, a network element, terminal, a device, base station and a communication system.

According to one aspect of the present invention, there is provided a method for handover of a mobile terminal from a first network to a second network, comprising the steps of: determining a WDP including an unnecessary handover probability and a missing handover probability according to conditions of the first network and the second network; detecting at least one of the following: whether the unnecessary handover probability is greater than the missing handover probability, whether the unnecessary handover probability is greater than a specific threshold and whether the missing handover probability is smaller than the specific threshold; and making a handover decision based on the detection result.

According to the second aspect of the present invention, there is provided a device for handover of a mobile terminal from a first network to a second network, comprising: determining means for determining a WDP including an unnecessary handover probability and a missing handover probability according to conditions of the first network and the second network; detecting means for detecting at least one of the following: whether the unnecessary handover probability is greater than the missing handover probability, whether the unnecessary handover probability is greater than a specific threshold and whether the missing handover probability is smaller than a specific threshold; and handover deciding means for making a handover decision based on the result of the detecting means.

According to the third aspect of the present invention, there is provided a base station for handover of a mobile terminal from a first network to a second network, comprising the above mentioned device for handover of a mobile terminal from a first network to a second network.

According to a fourth aspect of the present invention, there is provided a mobile terminal used in a first network and a second network, comprising the above mentioned device for handover of a mobile terminal from a first network to a second network.

According to a fifth aspect of the present invention, there is provided a network element used in a first network and a second network, comprising the above mentioned device for handover of a mobile terminal from a first network to a second network.

According to a sixth aspect of the present invention, there is provided a wireless communications network, comprising: a first network, a second network, a mobile terminal having determining means and a network element having detecting means and handover deciding means, wherein the determining means of the mobile terminal is configured to determine a WDP including an unnecessary handover probability and a missing handover probability according to conditions of the first network and the second network; the detecting means in the network element is configured to detect at least one of the following: whether the unnecessary handover probability is greater than the missing handover probability, whether the unnecessary handover probability is greater than a specific threshold and whether the missing handover probability is smaller than a specific threshold; and the handover deciding means in the network element is configured to make a handover decision based on the result of the detecting means.

According to a seventh aspect of the present invention, there is provided a wireless communications system comprising: a first network, a second network, a mobile terminal, a base station having determining means and a network element having detecting means and handover deciding means, wherein the determining means of the base station is configured to determine a WDP including an unnecessary handover probability and a missing handover probability according to conditions of the first network and the second network; the detecting means in the network element is configured to detect at least one of the following: whether the unnecessary handover probability is greater than the missing handover probability, whether the unnecessary handover probability is greater than a specific threshold and whether the missing handover probability is smaller than a specific threshold; and the handover deciding means in the network element is configured to make a handover decision based on the result of the detecting means.

According to a eighth aspect of the present invention, there is provided a wireless communications system comprising the above mentioned network element, the above mentioned base station or the above mentioned mobile terminal.

According to an ninth aspect of the present invention, there is provided a computer program product comprising computer executable instructions, which, when being executed on a general purposed computer device, makes the device to be configured to execute the above mentioned method.

According to a tenth aspect of the present invention, there is provide a storage medium for storing computer executable instructions, which, when being executed on a general purposed computer device, makes the device to be configured to execute the above mentioned method.

BRIEF DESCRIPTION OF THE DRAWINGS

It is believed that the purposes, features and advantages of the present invention will be better understood from the following description of the detailed implementation of the present invention taken in conjunction with the accompanying drawings, in which.

DETAILED DESCRIPTION OF EMBODIMENTS OF THE INVENTION

Next, various embodiments of the present invention will be described in detail in conjunction with accompany drawings.

Figure 1:
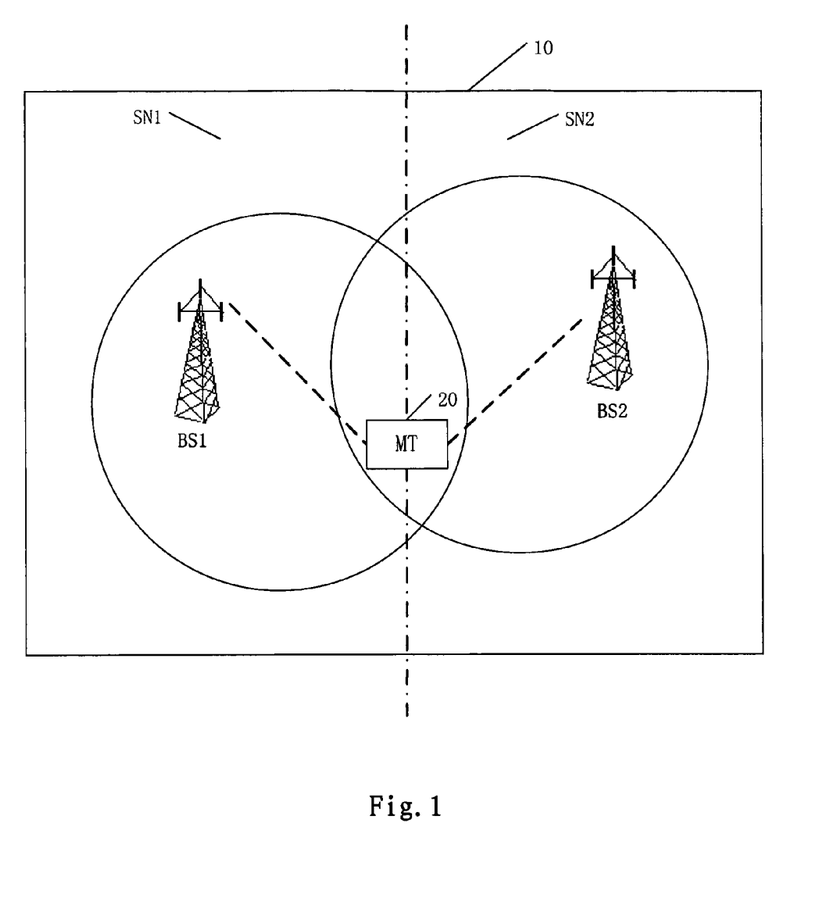
FIG. 1 is a schematic diagram of a communications system according to an embodiment of the present invention.

FIG. 1 is a schematic diagram of a communications system according to an embodiment of the present invention.

As shown in FIG. 1, a communications system 10 according to an embodiment of the present invention comprises a first network SN1, a second network SN2, a base station BS1 in the first network, a base station BS2 in the second network and a mobile terminal (MT) 20. The first network SN1 and the second network SN2 can be different types of networks, respectively, and can be the same type of networks from different network carriers. For example, the first network can be GSM or CDMA, the second network can be WLAN or WiMAX, and the mobile terminal 20 can be a hybrid terminal having a two-mode interface, and is located on the border between the two networks.

When the mobile terminal 20 moves from a cell to another cell, handover needs to be made to maintain the call of the mobile user uninterrupted. In the process of the handover, there can exist such three types of process controls as mobile station controlled handover (MCHO), network controlled handover (NCHO) and mobile station aided handover (MAHO). In terms of each type of handover, each of a mobile terminal (MT) and a base station (BS) can begin to initiate a handover. The handover process mainly comprises such three steps as handover measurement, handover decision and handover execution.

In the case of mobile station controlled handover, the mobile station performs handover measurement and handover decision. The mobile station continuously detects the conditions of a present base station and several candidate base stations, and the mobile station selects an optimal candidate base station having available service channels and transmits a handover request when a certain handover criterion is met.

In the case of network controlled handover, the base station monitors the condition from the mobile station, and the network begins to arrange a handover to another base station when a certain cross-cell handover rule is met.

In the case of mobile station aided handover, the network requires the mobile station to measure the signals of its surrounding base stations and report the result to the current base station, and the network determines when to initiate a handover and which base station to make a handover to according to the detecting result.

For simplicity, an embodiment based on WDP of the present invention will be described in detail by taking the mobile station controlled handover as an example. A person skilled in the art can understand that the embodiment based on WDP of the present invention can also be implemented in the network controlled handover process and the mobile station aided handover process.

Figure 2:
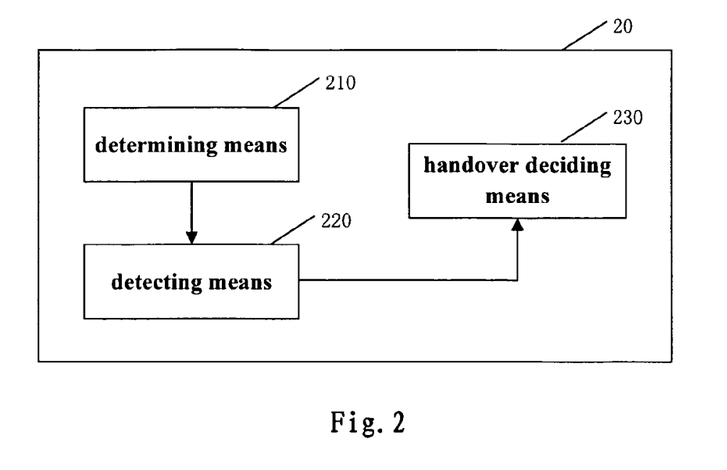
FIG. 2 shows a schematic diagram of a mobile terminal according to an embodiment of the present invention.

FIG. 2 is a schematic diagram of a mobile terminal 20 according to another embodiment of the present invention. As shown in FIG. 2, a mobile terminal 20 used in the first network and the second network comprises determining means 210 for determining a WDP according to conditions of the first network and the second network, wherein the WDP includes an unnecessary handover probability and a missing handover probability; detecting means 220 for detecting whether the unnecessary handover probability is greater than the missing handover probability; and handover deciding means 230 for making a handover decision based on the result of the detecting means 220.

Figure 3:
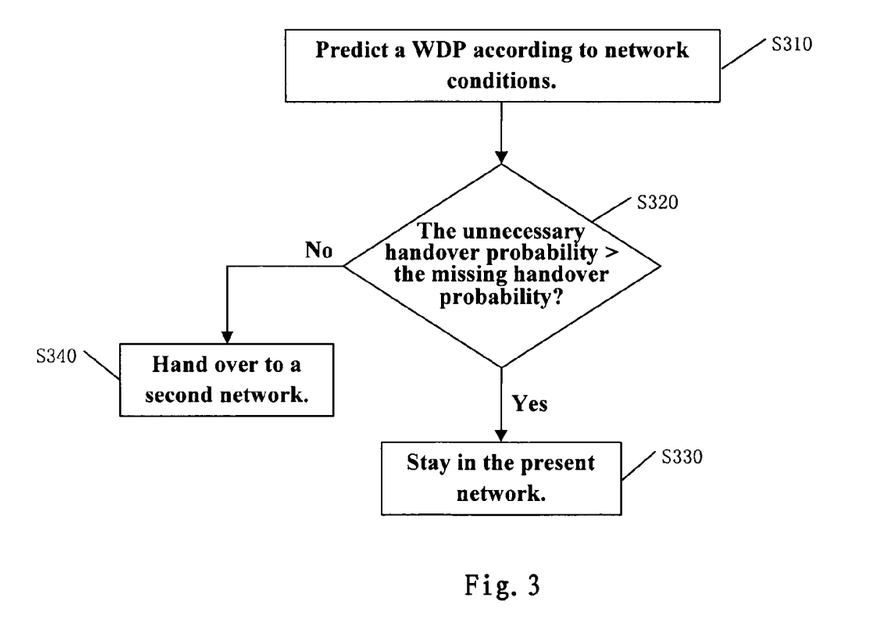
FIG. 3 shows a flowchart of a method according to an embodiment of the present invention.

In an embodiment of the present invention, there is provided a method for handover of a mobile terminal from a first network SN1 to a second network SN2. As shown in FIG. 3, in step S310, the determining means 210 of the mobile terminal 20 determines the unnecessary handover probability and the missing handover probability, i.e. determines the WDP according to the conditions of the first network and the second network including traffic load $\lambda$, decision-period D, application requirement r, available bandwidth i of the first network and available bandwidth j of the second network. The specific principle is as following:

Wireless networks are denoted as $n_i$, i=1, 2, ..., N. $B_i$ and $b_i$ are the maximum capacity and available bandwidth of network i,i=1, 2, ..., N respectively. N is the maximum number of considered networks. A wrong decision is defined as:

For $\forall$i=1, ..., N, (1) unnecessary handover: a mobile node MN is in network $n_i$, and MN decides to move to $n_j$ at time $t_1$, but at time $t_2(t_2>t_1)$, the new network can not satisfy the bandwidth requirement, i.e., $b_i \geq r$, $b_j < r$. This kind of events is denoted as $\gamma_{n_j|n_i}$; (2) missing handover: the mobile node MN is in network $n_i$ and MN decides to still stay in network $n_i$ at time $t_1$, but at time $t_2$ ($t_2>t_1$), the network can not satisfy the bandwidth requirement while another network $n_j$ can, i.e., $b_j \geq r$, $b_i < r$. This kind of events is denoted as $\Theta_{n_i}$.

A WDP is the sum of the probabilities of the above mentioned events, i.e., $$WDP = \sum_{i=1}^{N} \sum_{\substack{j=1 \\ j\neq i}}^{N} Pr\{\gamma_{n_j|n_i}\} + \sum_{i=1}^{N} Pr\{\Theta_{n_i}\} \quad (1)$$

To reduce unnecessary handovers, a mobile node tends to reduce handover times; while to reduce missing handovers, a mobile node tends to increase handover times. If reducing unnecessary handovers is taken as the only handover performance evaluation criterion, a mobile node will be biased to conduct a handover at all, which is not reasonable in face of so many networks providing better services. On the other hand, if only missing handover is taken into consideration, too many handovers may occur to waste network bandwidth. In the WDP of the embodiment of the present invention, the two parameters are combined such that they both have impact on the WDP. Therefore, an optimal handover scheme based on the WDP should not be too conservative to conduct a handover, and not too sensitive to suffer handover flap.

The WDP depends on the decision time interval D that is $D=t_2-t_1$. The time when a mobile node makes a decision to move or stay is denoted as t, and the time to decide if the decision is correct or wrong is t+D. For each network and mobile node, the decision time interval D is predefined.

The following events are defined:

$M_{n_j|n_i}$ (t) refers to a mobile node decides to move from network $n_i$ to network $n_j$ at time t;

$S_{n_i}$ (t) refers to a mobile node is in network $n_i$ and decides to still stay in the present network at time t;

$\Psi_{n_j,n_i}$(r,t) refers to that the available bandwidth of network $n_i$ is greater or equal to application requirement r, and the available bandwidth of network $n_j$ is less than r at time t.

Furthermore, $P_{n_j|n_i} = Pr\{M_{n_j|n_i}(t)\}$ is the probability that a mobile node moves from network $n_i$ to network $n_j$ at time t; and $P_{n_i|n_i} = Pr\{S_{n_i}(t)\}$ is the probability that a mobile node is in network $n_i$ and still in network $n_i$ at time t.

$$\text{So } Pr\{\gamma_{n_j|n_i}\} = P_{n_i} P_{n_j|n_i} \times Pr\{\Psi_{n_i,n_j}(r, t+D) \mid M_{n_j|n_i}(t)\} \quad (2)$$

$$Pr\{\Theta_{n_i}\} = P_{n_i}(1 - P_{n_j|n_i}) \times Pr\{\Psi_{n_j,n_i}(r, t+D) \mid S_{n_i}(t)\} \quad (3)$$

$$\text{Suppose } N = 2, \quad (4)$$

then $WDP = Pr\{\gamma_{n_2|n_1}\} + Pr\{\gamma_{n_1|n_2}\} + Pr\{\Theta_{n_1}\} + Pr\{\Theta_{n_2}\}$ Wherein (5)

$$Pr\{\gamma_{n_2|n_1}\} = \sum_{k=1}^{i-r} \sum_{m=0}^{B_i-i} \frac{(\lambda D)^{k+2m}}{(m+k)!m!} e^{-2\lambda D} \times \sum_{k=j-r+1}^{\infty} \sum_{m=0}^{B_2-j} \frac{(\lambda D)^{k+2m}}{(m+k)!m!} e^{-2\lambda D}$$

-continued $$Pr\{\Theta_{n_1|n_1}\} = \left(1 - \sum_{k=1}^{i-r} \sum_{m=0}^{B_i-i} \frac{(\lambda D)^{k+2m}}{(m+k)!m!} e^{-2\lambda D}\right) \times \quad (6)$$

$$\left(1 - \sum_{k=j-r+1}^{\infty} \sum_{m=0}^{B_2-j} \frac{(\lambda D)^{k+2m}}{(m+k)!m!} e^{-2\lambda D}\right)$$

$$Pr\{\gamma_{n_1|n_2}\} = Pr\{\Theta_{n_1|n_1}\} \quad (7)$$

$$Pr\{\Theta_{n_2|n_2}\} = Pr\{\gamma_{n_2|n_1}\} \quad (8)$$

The available bandwidth in the handover process is used as a main metric. But the WDP can also use other parameters.

Now returning to FIG. 3, next in step S320, the detecting means 220 of the mobile terminal 20 detects whether the unnecessary handover probability is greater than the missing handover probability. Suppose the present network is $n_1$, then the detecting means 220 detects whether $Pr\{\gamma_{n_2|n_1}\}>Pr\{\Theta_{n_1|n_1}\}$ is satisfied; and if so (affirmative in step S320), the mobile terminal remains in the present network and not conduct a handover (step S330); and if not (negative in step 320), then the mobile terminal conducts a handover to the second network (step S340).

In an embodiment of the present invention, preferably, a lagging margin L is introduced to make a handover decision, i.e. it is detected whether $Pr\{\gamma_{n_2|n_1}\}>Pr\{\Theta_{n_1|n_1}\}+L$ is satisfied. Thus a mobile terminal can be controlled to conduct handovers back and forth between two networks.

In an embodiment of the present invention, preferably, a lagging margin $\Re$ is introduced to make a handover decision, i.e. it is detected whether $Pr\{\gamma_{n_2|n_1}\}>\Re \times Pr\{\Theta_{n_1|n_1}\}$ is satisfied, where $\Re >0$. Thus a mobile terminal can be controlled to conduct handovers back and forth between two networks.

In an embodiment of the present invention, preferably, a threshold variable $L_0$ is further introduced to make a handover decision, i.e. it is detected whether $Pr\{\gamma_{n_2|n_1}\}>L_0$ is satisfied, where $L_0>0$. If it is satisfied, then a mobile terminal remains in the present network; and if not, then the mobile terminal conducts a handover to the second network. Thus a mobile terminal can be controlled to conduct handovers back and forth between two networks.

In the embodiment of the present invention, preferably, a threshold variable $L_1$ is introduced to make a handover decision, i.e. it is detected whether $Pr\{\Theta_{n_1|n_1}\}<L_1$ is satisfied, where $L_1>0$. If it is satisfied, then a mobile terminal remains in the present network, otherwise the mobile terminal conducts a handover to the second network. Thus a mobile terminal can be controlled to conduct handovers back and forth between two networks.

Of course, in embodiments of the present invention, it may also be performed to detect at least one of the following: whether the unnecessary handover probability is greater than the missing handover probability, whether the unnecessary handover probability is greater than a specific threshold and whether the missing handover probability is smaller than a specific threshold, the terminal is kept to stay in the present network if the condition is met, and is controlled to conduct a handover to the second network if not; in the embodiment, a lagging margin and a threshold variable may also be introduced, and the detailed descriptions are omitted here.

A person skilled in the art can understand that there may exist many other variations and modifications or combination with variations and modifications without departing from the spirit of the present invention.

Figure 4:
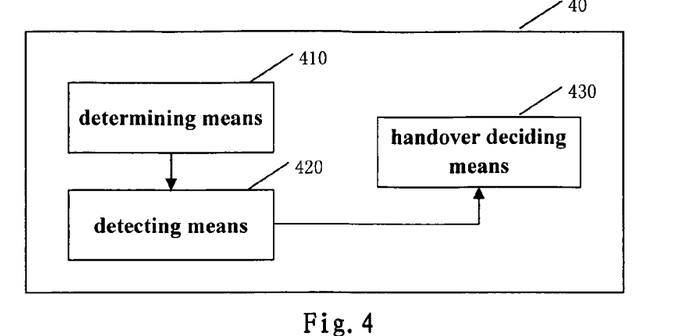
FIG. 4 shows a schematic diagram of a network element according to an embodiment of the present invention.

Under a same inventive concept, FIG. 4 is a structural block diagram of the device 40 for handover of a mobile terminal between two networks according to another embodiment of the present invention. The device for handover 40 may comprises: determining means 410 for determining a WDP including an unnecessary handover probability and a missing handover probability according to conditions of the first network and the second network; detecting means 420 for detecting at least of the follow: whether the unnecessary handover probability is greater than the missing handover probability, whether the unnecessary handover probability is greater than a specific threshold and whether the missing handover probability is smaller than the specific threshold; and handover deciding means 430 for making a handover decision based on the result of the detecting means 420. In the present embodiment, the description for the parts having same principles as those of the above embodiments will be properly omitted. The present embodiment will be described in detail below in conjunction with the drawings.

In the embodiment of the present invention, the determining means 410 of the device 40 for handover of a mobile terminal between two networks can also calculate the unnecessary handover probability and the missing handover probability, i.e., determine the WDP according to the conditions of the first network SN1 and the second networks SN2; its detecting means 420 detects whether the unnecessary handover probability is greater than the missing handover probability, and preferably detects whether the unnecessary handover probability is greater than the sum of or the product of the missing handover probability and the lagging margin L, or whether the unnecessary handover probability is greater than a specific threshold or whether the missing handover probability is smaller than a specific threshold, and may also detect at least of the following: whether the unnecessary handover probability is greater than the missing handover probability, whether the unnecessary handover probability is greater than a specific threshold and whether the missing handover probability is smaller than the specific threshold; if the result is affirmative, the handover deciding means 430 keeps the mobile terminal in the present network, and if the result is negative, the mobile terminal conducts a handover to the second network.

Figure 5:
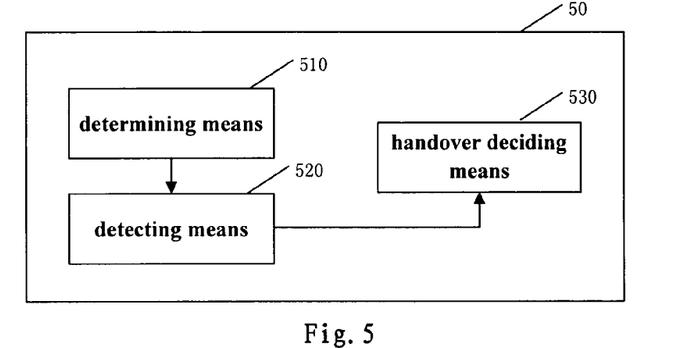
FIG. 5 shows a schematic diagram of a base station according to an embodiment of the present invention.

Similarly, in another embodiment of the present invention, the base station 50 as shown in FIG. 5 comprises the above mentioned device 40 for handover, the determining means 510 of the base station 50 can also calculate the unnecessary handover probability and the missing handover probability, i.e., determine the WDP according to the conditions of the first network SN1 and the second networks SN2; its detecting means 520 detects whether the unnecessary handover probability is greater than the missing handover probability, preferably detects whether the unnecessary handover probability is greater than the sum or product of the missing handover probability and the lagging margin L, or whether the unnecessary handover probability is greater than a specific threshold or whether the missing handover probability is smaller than a specific threshold, and may also detect at least of the following: whether the unnecessary handover probability is greater than the missing handover probability, whether the unnecessary handover probability is greater than a specific threshold and whether the missing handover probability is smaller than the specific threshold; handover deciding means 530 makes a handover decision according to the result of the detecting means 520; and if the result is affirmative, the mobile terminal remains in the present network, and if the result is negative, the mobile terminal conducts a handover to the second network.

Similarly, the network element in an embodiment of the present invention may also comprise the above mentioned device 40, provided with determining means, detecting means and handover deciding means, to control a handover of the mobile terminal between two networks.

Figure 6:
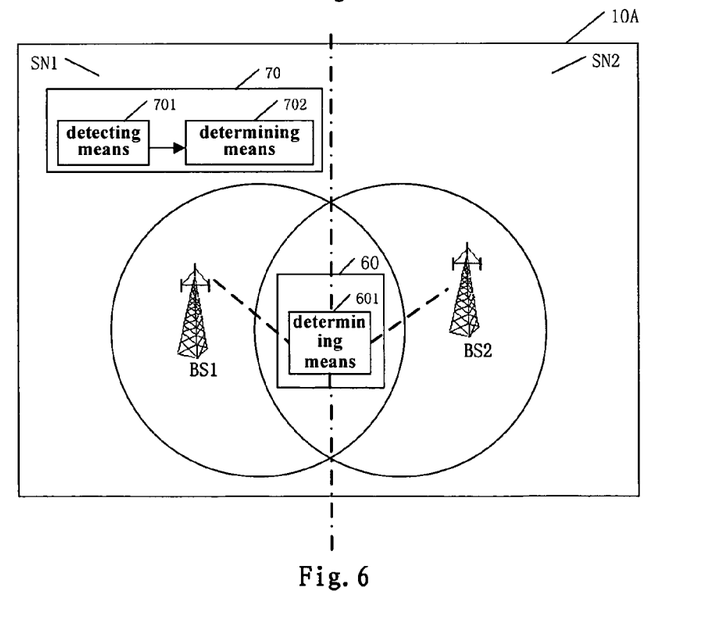
FIG. 6 shows a schematic diagram of a first communications system according to another embodiment of the present invention.

As shown in FIG. 6, in another embodiment of the present invention, a first wireless communications system 10A comprises a first network SN1, a second network SN2, a base station BS1, a base station BS2, a mobile terminal 60 having determining means 601 and a network element 70 having detecting means 701 and handover deciding means 702. The determining means 601 of the mobile terminal 60 is configured to determine a WDP including an unnecessary handover probability and a missing handover probability according to conditions of the first network and the second network; the detecting means 701 in the network element 70 is configured to detect whether the unnecessary handover probability is greater than the missing handover probability, and preferably detects whether the unnecessary handover probability is greater than the sum or product of the missing handover probability and the lagging margin L, whether the unnecessary handover probability is greater than a specific threshold or whether the missing handover probability is smaller than a specific threshold, and may also detect at least of the following: whether the unnecessary handover probability is greater than the missing handover probability, whether the unnecessary handover probability is greater than a specific threshold and whether the missing handover probability is smaller than the specific threshold; and the handover deciding means 702 of the network element is configured to make a handover decision based on the result of the detecting means 701: if the result is affirmative, the mobile terminal is kept in the present network, and if the result is negative, the mobile terminal is made a handover to the second network.

Figure 7:
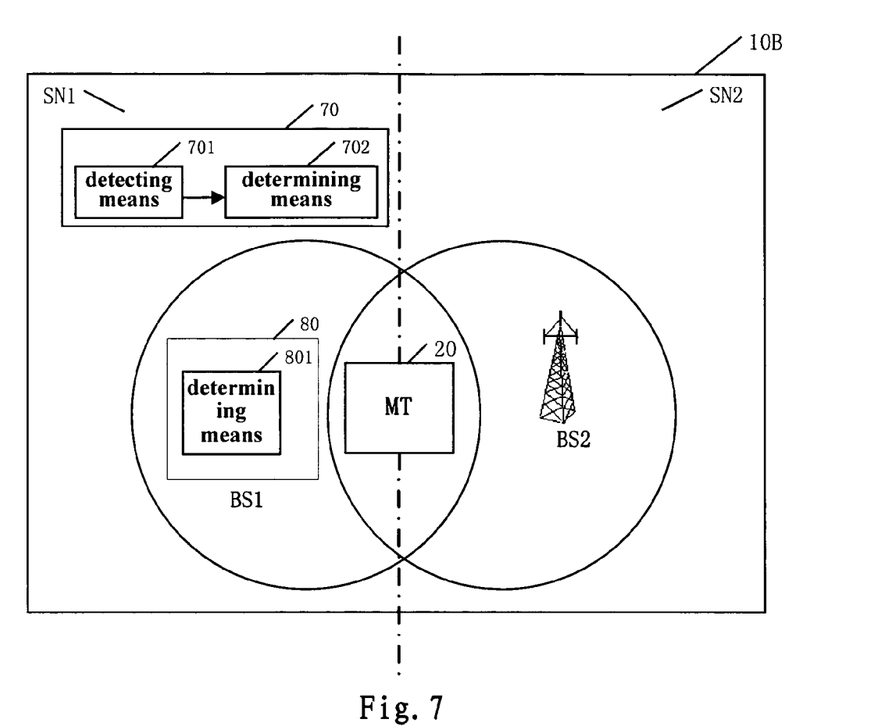
FIG. 7 shows a schematic diagram of a second communications system according to another embodiment of the present invention.

As shown in FIG. 7, in another embodiment of the present invention, a second wireless communications system 10B comprises a first network SN1, a second network SN2, a base station BS2, a mobile terminal 20, a base station 80 having determining means 801 and a network element 70 having detecting means 701 and handover deciding means 702. The determining means 801 of the base station 80 is configured to determine a WDP including an unnecessary handover probability and a missing handover probability according to conditions of the first network SN1 and the second network SN2; the detecting means 701 in the network element 70 is configured to detect whether the unnecessary handover probability is greater than the missing handover probability, and preferably detect whether the unnecessary handover probability is greater than the sum or product of the missing handover probability and a lagging margin L, whether the unnecessary handover probability is greater than a specific threshold or whether the missing handover probability is smaller than a specific threshold, and may also detect at least of the following: whether the unnecessary handover probability is greater than the missing handover probability, whether the unnecessary handover probability is greater than a specific threshold and whether the missing handover probability is smaller than the specific threshold; and the handover deciding means 702 in the network element 70 is configured to make a handover decision based on the result of the detecting means 701: if the result is affirmative, the mobile terminal is kept in the present network, and if the result is negative, the mobile terminal is made a handover to the second network.

In embodiments of the present invention, when a wireless communications system comprises the terminal of the present invention, the base station and the network element in the communications system are a traditional base station and network element. A person skilled in the art can understand that other parts adopted in the communications system are traditional when the base station or network element of the present invention is used.

The WDP of the handover scheme based on the WDP of the embodiments of the present invention is less than that of other handover schemes based only on bandwidth requirement by two orders of magnitude. The handover scheme based on the WDP of the embodiments of the present invention can enable accurate handovers, making a communications system to have better performance in maintaining continuous calls.

A person skilled in the art can understand that the above mentioned method can be implemented by using computer executable instructions and/or by being incorporated in processor control codes which are provided in a carrier medium such as a floppy disk, a CD or a DVD-ROM, a programmable memory such as an ROM (firmware) or a data carrier such as an optical or electrical signal carrier. The mobile terminal, the base station, the network element and components thereof can be implemented by a hardware circuitry, such as an ultra LSIC or a gate array, a semiconductor device such as a logical chip or a transistor, or a programmable hardware device such as a field programmable gate array or a programmable logic device, can also be implemented by a software executed by various kinds of processing devices such as a computer device, and can also implemented by a combination the hardware circuit and the software.

While a method for handover of a mobile terminal from a first network to a second network, a network element, a mobile terminal, a base station and a communications system as well as a computer program product and a storage medium of the present invention are described in detail in conjunction with the specific embodiments, the present invention is not limited to these embodiments, and a person skilled in the art can understand that various changes, alternatives and modifications can be made to the present invention without departing from the spirit and scope of the present invention, the protection scope of which is defined by the appended claims.

The invention claimed is:

1. A method for handover of a mobile terminal from a first network to a second network, comprising:
   determining a wrong decision probability (WDP) according to conditions of the first network and the second network, wherein the WDP includes an unnecessary handover probability and a missing handover probability and the conditions include at least application requirements and available bandwidth on the networks;
   detecting at least one of the following: whether the unnecessary handover probability is greater than the missing handover probability, whether the unnecessary handover probability is greater than a specific threshold and whether the missing handover probability is smaller than a specific threshold; and
   making a handover decision based on the detection result and the application requirements.

2. The method according to claim 1, wherein making a handover decision further comprises:
   keeping the terminal in the first network when the detection result is affirmative; and
   conducting a handover of the terminal to the second network when the detection result is negative.

3. The method according to claim 1, wherein determining the WDP further comprises:
   determining the WDP based on a bandwidth requirement.

4. The method according to claim 1, further comprising:
   detecting whether the unnecessary handover probability is greater than the sum or the product of the missing handover probability and a lagging margin.

5. The method according to claim 1, wherein the type of first network is different from that of the second network.

6. The method according to claim 1, wherein the conditions further include traffic load on the networks and a decision period.

7. A device for handover of a mobile terminal from a first network to a second network, comprising:
   a determination component configured to determine a wrong decision probability (WDP) according to conditions of the first network and the second network, wherein the WDP includes an unnecessary handover probability and a missing handover probability and the conditions include at least application requirements and available bandwidth on the networks;
   a detector configured to detect at least one of the following: whether the unnecessary handover probability is greater than the missing handover probability, whether the unnecessary handover probability is greater than a specific threshold and whether the missing handover probability is smaller than a specific threshold; and
   a handover decision component that is operative to make a handover decision based on the result of the detector and the application requirements.

8. The device according to claim 7, wherein the handover decision component is configured to keep the terminal in the first network when the result of the detector is affirmative, and conduct a handover of the terminal to the second network when the result of the detector is negative.

9. The device according to claim 7, wherein the determination component is configured to further determine the WDP based on a bandwidth requirement.

10. The device according to claim 7, wherein the detector is configured to detect whether the unnecessary handover probability is greater than the sum or the product of the missing handover probability and a lagging margin.

11. The device according to claim 7 implemented with a base station for handover of a mobile terminal from a first network to a second network.

12. The device according to claim 7 implemented with a mobile terminal used in a first network and a second network.

13. The device according to claim 7 implemented with a network element for handover of a mobile terminal from a first network to a second network.

14. The device according to claim 7, wherein the conditions further include traffic load on the networks and a decision period.

15. A wireless communications network, comprising: a first network, a second network, a mobile terminal having a determination component and a network element having a detector and a handover decision component, wherein
   the determination component of the mobile terminal is configured to determine a wrong decision probability (WDP) including an unnecessary handover probability and a missing handover probability according to conditions of the first network and the second network and the conditions include at least application requirements and available bandwidth on the networks;
   the detector in the network element is configured to detect at least one of the following: whether the unnecessary handover probability is greater than the missing handover probability, the unnecessary handover probability is greater than a specific threshold and whether the missing handover probability is smaller than the specific threshold; and the handover decision component in the network element is configured to make a handover decision based on the result of the detector and the application requirements.

16. The wireless communications network according to claim 15, wherein the handover decision component in the network element is configured to keep the terminal in the first network when the result of the detector is affirmative, and conduct a handover of the terminal to the second network when the result of the detector is negative.

17. The wireless communications network according to claim 15, wherein the detector is configured to detect whether the unnecessary handover probability is greater than the sum or the product of the missing handover probability and a lagging margin.

18. The wireless telecommunications network according to claim 15, wherein the conditions further include traffic load on the networks and a decision period.

* * * * *